US007897534B2

(12) United States Patent
Biscan et al.

(10) Patent No.: US 7,897,534 B2
(45) Date of Patent: Mar. 1, 2011

(54) MANUFACTURE AND USE OF ENGINEERED CARBIDE AND NITRIDE COMPOSITES (75) Inventors: Giang Biscan, Fontana, CA (US);
Hamid Hojaji, Las Vegas, NV (US);
David Leslie Melmeth, Upland, CA (US); Thinh Pham, Rancho Cucamonga, CA (US); Mark G. Stevens, Rancho Cucamonga, CA (US); Huagang Zhang, Yacaipa, CA (US)

(73) Assignee: James Hardie Technology Limited

( * ) Notice: Subject to any disclaimer, the term of this patent is extended or adjusted under 35 U.S.C. 154(b) by 0 days.

(21) Appl. No.: 12/425,217

(22) Filed: Apr. 16, 2009

(65) Prior Publication Data
US 2009/0200512 A1  Aug. 13, 2009

Related U.S. Application Data (62) Division of application No. 10/977,344, filed on Oct. 29, 2004, now abandoned.

(60) Provisional application No. 60/515,863, filed on Oct. 29, 2003.

(51) Int. Cl.
*C04B 35/565* (2006.01)
*C03C 6/00* (2006.01)
*C03C 6/04* (2006.01)

(52) U.S. Cl. .................. 501/88; 501/27; 501/29; 501/32; 423/345

(58) Field of Classification Search ............. 501/27–31, 501/88–90, 32; 423/345
See application file for complete search history.

(56) References Cited

U.S. PATENT DOCUMENTS

| | | |
|---|---|---|
| 1,819,093 A | 8/1931 | Hardinge |
| 2,619,776 A | 12/1952 | Potters |
| 2,676,892 A | 4/1954 | McLaughlin |
| 2,746,735 A | 5/1956 | Bradford |
| 2,762,619 A | 9/1956 | Booth |
| 2,782,018 A | 2/1957 | Bradford |
| 2,797,201 A | 6/1957 | Veatch |
| 2,838,881 A | 6/1958 | Plumat |
| 2,945,326 A | 7/1960 | Wood |
| 2,947,115 A | 8/1960 | Wood |
| 2,978,339 A | 4/1961 | Veatch et al. |
| 2,978,340 A | 4/1961 | Veatch et al. |
| 3,010,177 A | 11/1961 | Thompson et al. |
| 3,081,179 A | 3/1963 | Charvat et al. |
| 3,150,947 A | 9/1964 | Bland |
| 3,215,505 A | 11/1965 | Schmalfeld et al. |
| 3,256,105 A | 6/1966 | Alford |
| 3,279,905 A | 10/1966 | Wood et al. |
| 3,293,014 A | 12/1966 | Callender et al. |
| 3,297,411 A | 1/1967 | Dear |
| 3,321,414 A | 5/1967 | Vieli |
| 3,341,314 A | 9/1967 | Vukasovich et al. |
| 3,348,956 A | 10/1967 | Ekdahl |
| 3,365,315 A | 1/1968 | Beck et al. |
| 3,495,961 A | 2/1970 | Lange |
| 3,560,185 A | 2/1971 | Nylander |
| 3,560,186 A | 2/1971 | Nylander |
| 3,736,162 A | 5/1973 | Chvalovsky et al. |
| 3,752,685 A | 8/1973 | Honda et al. |
| 3,782,985 A | 1/1974 | Gebhardt |
| 3,838,998 A | 10/1974 | Matthews et al. |
| 3,873,475 A | 3/1975 | Pechacek et al. |
| 3,877,918 A | 4/1975 | Cerbo |
| 3,887,386 A | 6/1975 | Majumdar et al. |
| 3,888,957 A | 6/1975 | Netting |
| 3,904,377 A | 9/1975 | Honda et al. |
| 3,904,424 A | 9/1975 | Aoki et al. |
| 3,909,283 A | 9/1975 | Warnke |
| 3,924,901 A | 12/1975 | Phillips |
| 3,954,390 A | 5/1976 | Akhundov et al. |
| 4,002,482 A | 1/1977 | Coenen et al. |
| 4,046,548 A | 9/1977 | Wood et al. |
| 4,057,908 A | 11/1977 | Mirliss et al. |
| 4,059,423 A | 11/1977 | De Vos et al. |
| 4,102,773 A | 7/1978 | Green et al. |
| 4,111,713 A | 9/1978 | Beck |
| 4,133,854 A | 1/1979 | Hendricks |
| 4,153,439 A | 5/1979 | Tomic et al. |
| 4,161,389 A | 7/1979 | Staffin et al. |
| 4,205,992 A | 6/1980 | Mogensen et al. |
| 4,217,335 A | 8/1980 | Sasaki et al. |

(Continued)

FOREIGN PATENT DOCUMENTS

CA     1040859     10/1978

(Continued)

OTHER PUBLICATIONS

3M Material Safety Data Sheet, 3M Glass Bubbles Types K and S, Apr. 10, 2006, 7 pp.

(Continued)

*Primary Examiner* — Karl E Group
(74) *Attorney, Agent, or Firm* — Gardere Wynne Sewell, LLP (57) ABSTRACT

Precursor materials and methods of making are disclosed. The precursor materials include at least one of a silica source, and a carbon source, with or without liquid and a binder The methods described include pyrolyzing the precursor material to form a carbonaceous mixture and heat treating the mixture for a pre-determined time and at an elevated temperature during which carbon and/or nitrogen react with silica in the mixture to form carbides and/or nitrides. The carbides and nitrides formed from said methods may be used as blowing agents in a glass, ceramic, or metal forming processes or for promoting dispersion of the carbides and nitrides throughout a glass, ceramic, or metal composite.

22 Claims, 3 Drawing Sheets

U.S. PATENT DOCUMENTS

| | | | |
|---|---|---|---|
| 4,226,841 A | 10/1980 | Komeya et al. | |
| 4,234,344 A | 11/1980 | Tinsley et al. | |
| 4,235,753 A | 11/1980 | Brown et al. | |
| 4,235,836 A | 11/1980 | Wassell et al. | |
| 4,243,421 A | 1/1981 | Kume | |
| 4,252,193 A | 2/1981 | Powers et al. | |
| 4,292,206 A | 9/1981 | Barnes, Jr. et al. | |
| 4,303,732 A | 12/1981 | Torobin | |
| 4,304,604 A | 12/1981 | Daerr et al. | |
| 4,305,758 A | 12/1981 | Powers et al. | |
| 4,307,142 A | 12/1981 | Blitstein et al. | |
| 4,330,634 A | 5/1982 | Rodaway | |
| 4,332,618 A | 6/1982 | Ballard | |
| 4,336,338 A | 6/1982 | Downs et al. | |
| 4,340,407 A | 7/1982 | Anderson et al. | |
| 4,347,155 A | 8/1982 | Jenkins | |
| 4,362,566 A | 12/1982 | Hinterwaldner | |
| 4,363,878 A | 12/1982 | Yamamoto et al. | |
| 4,370,166 A | 1/1983 | Powers et al. | |
| 4,394,346 A | 7/1983 | Morooka et al. | |
| 4,411,847 A | 10/1983 | Netting et al. | |
| 4,430,108 A | 2/1984 | Hojaji et al. | |
| 4,448,599 A | 5/1984 | Mackenzie et al. | |
| 4,475,936 A | 10/1984 | Aston et al. | |
| 4,487,620 A | 12/1984 | Neusy et al. | |
| 4,501,830 A | 2/1985 | Miller et al. | |
| 4,504,320 A | 3/1985 | Rizer et al. | |
| 4,512,736 A | 4/1985 | Wader et al. | |
| 4,519,777 A | 5/1985 | Akhtyamov et al. | |
| 4,538,530 A | 9/1985 | Whitman | |
| 4,540,629 A | 9/1985 | Sands et al. | |
| 4,595,662 A | 6/1986 | Mochida et al. | |
| 4,602,962 A | 7/1986 | Fehlmann et al. | |
| 4,621,024 A | 11/1986 | Wright | |
| 4,623,390 A | 11/1986 | Delmonico | |
| 4,624,798 A | 11/1986 | Gindrup et al. | |
| 4,629,413 A | 12/1986 | Michelson et al. | |
| 4,637,990 A | 1/1987 | Torobin | |
| 4,643,753 A | 2/1987 | Braun | |
| 4,652,433 A | 3/1987 | Ashworth et al. | |
| 4,652,535 A | 3/1987 | Mackenzie et al. | |
| 4,657,810 A | 4/1987 | Douden | |
| 4,661,137 A | 4/1987 | Garnier et al. | |
| 4,677,022 A | 6/1987 | Dejaiffe | |
| 4,687,752 A | 8/1987 | Peters | |
| 4,749,398 A | 6/1988 | Braun | |
| 4,751,202 A | 6/1988 | Toussaint et al. | |
| 4,751,203 A | 6/1988 | Toussaint et al. | |
| 4,752,061 A | 6/1988 | Dalton et al. | |
| 4,767,726 A | 8/1988 | Marshall | |
| 4,769,189 A | 9/1988 | Douden | |
| 4,784,839 A * | 11/1988 | Bachelard et al. | 423/290 |
| 4,818,289 A | 4/1989 | Mantymaki et al. | |
| 4,818,290 A | 4/1989 | Tuovinen et al. | |
| 4,819,289 A | 4/1989 | Gibbs | |
| 4,826,788 A | 5/1989 | Dennert et al. | |
| 4,830,989 A | 5/1989 | Trivedi et al. | |
| 4,837,069 A | 6/1989 | Bescup et al. | |
| 4,851,203 A * | 7/1989 | Bachelard et al. | 423/290 |
| 4,867,931 A | 9/1989 | Cochran, Jr. | |
| 4,871,495 A | 10/1989 | Helferich et al. | |
| 4,882,302 A | 11/1989 | Horiuchi et al. | |
| 4,888,057 A | 12/1989 | Nguyen et al. | |
| 4,894,081 A | 1/1990 | Neusy et al. | |
| 4,904,292 A | 2/1990 | Neusy et al. | |
| 4,928,479 A | 5/1990 | Shekleton et al. | |
| 4,937,210 A | 6/1990 | Jones et al. | |
| 4,946,811 A | 8/1990 | Tuovinen et al. | |
| 4,981,666 A | 1/1991 | Yamada et al. | |
| 4,983,550 A | 1/1991 | Goetz et al. | |
| 5,002,696 A | 3/1991 | White | |
| 5,022,897 A | 6/1991 | Balcar et al. | |
| 5,064,784 A | 11/1991 | Saito et al. | |
| 5,069,702 A | 12/1991 | Block et al. | |
| 5,077,241 A | 12/1991 | Moh et al. | |
| 5,096,858 A * | 3/1992 | Das Chaklader et al. | 501/89 |
| 5,117,770 A | 6/1992 | Hassinen et al. | |
| 5,128,114 A | 7/1992 | Schwartz | |
| 5,143,534 A | 9/1992 | Kilner et al. | |
| 5,154,596 A | 10/1992 | Schwartz et al. | |
| 5,164,003 A | 11/1992 | Bosco et al. | |
| 5,164,345 A * | 11/1992 | Rice et al. | 501/91 |
| 5,176,732 A | 1/1993 | Block et al. | |
| 5,190,737 A | 3/1993 | Weimer et al. | |
| 5,194,334 A | 3/1993 | Uerdingen et al. | |
| 5,217,928 A | 6/1993 | Goetz et al. | |
| 5,253,991 A | 10/1993 | Yokota et al. | |
| 5,256,180 A | 10/1993 | Garnier et al. | |
| 5,292,690 A | 3/1994 | Kawachi et al. | |
| 5,349,118 A | 9/1994 | Davidovits | |
| 5,384,345 A | 1/1995 | Naton | |
| 5,407,983 A | 4/1995 | Naton | |
| 5,443,603 A | 8/1995 | Kirkendall | |
| 5,455,212 A * | 10/1995 | Das Chaklader et al. | 501/89 |
| 5,458,973 A | 10/1995 | Jeffs et al. | |
| 5,525,556 A * | 6/1996 | Dunmead et al. | 501/92 |
| 5,534,348 A | 7/1996 | Miller et al. | |
| 5,558,822 A | 9/1996 | Gitman et al. | |
| 5,559,170 A | 9/1996 | Castle | |
| 5,580,907 A | 12/1996 | Savin | |
| 5,591,684 A | 1/1997 | Kawachi et al. | |
| 5,601,789 A | 2/1997 | Ruhl et al. | |
| 5,609,833 A | 3/1997 | Ruhl et al. | |
| 5,611,833 A | 3/1997 | Brahmbhatt et al. | |
| 5,611,883 A | 3/1997 | Tompkins et al. | |
| 5,618,173 A | 4/1997 | Ruhl et al. | |
| 5,655,853 A | 8/1997 | Wormser | |
| 5,658,656 A | 8/1997 | Whitney et al. | |
| 5,676,536 A | 10/1997 | Ruhl et al. | |
| 5,676,563 A | 10/1997 | Kondo et al. | |
| 5,743,393 A | 4/1998 | Webb et al. | |
| 5,849,055 A | 12/1998 | Arai et al. | |
| 5,858,083 A | 1/1999 | Stav et al. | |
| 5,883,029 A | 3/1999 | Castle | |
| 5,895,768 A | 4/1999 | Speit et al. | |
| 5,899,256 A | 5/1999 | Rohatgi | |
| 5,925,449 A | 7/1999 | Davidovits | |
| 5,932,347 A | 8/1999 | Rapp et al. | |
| 5,935,699 A | 8/1999 | Barber et al. | |
| 5,967,211 A | 10/1999 | Lucas et al. | |
| 6,027,330 A | 2/2000 | Lifshits | |
| 6,034,155 A | 3/2000 | Espeland et al. | |
| 6,048,593 A | 4/2000 | Espeland et al. | |
| 6,077,327 A | 6/2000 | Hamayoshi et al. | |
| 6,105,888 A | 8/2000 | Goehner et al. | |
| 6,171,651 B1 | 1/2001 | Brown | |
| 6,207,077 B1 | 3/2001 | Burnell-Jones et al. | |
| 6,214,309 B1 * | 4/2001 | Shaw et al. | 423/345 |
| 6,254,845 B1 | 7/2001 | Ohashi et al. | |
| 6,254,981 B1 | 7/2001 | Castle | |
| 6,258,456 B1 | 7/2001 | Meyer | |
| 6,360,563 B1 | 3/2002 | Gerhardt et al. | |
| 6,367,288 B1 | 4/2002 | Lindner et al. | |
| 6,387,302 B1 | 5/2002 | Konya et al. | |
| 6,444,162 B1 | 9/2002 | Anshits et al. | |
| 6,461,988 B2 | 10/2002 | Budd et al. | |
| 6,486,084 B2 | 11/2002 | Oda et al. | |
| 6,506,819 B1 | 1/2003 | Shukla et al. | |
| 6,531,222 B1 | 3/2003 | Tanaka et al. | |
| 6,551,567 B2 | 4/2003 | Konya et al. | |
| 6,572,697 B2 | 6/2003 | Gleeson et al. | |
| 6,582,819 B2 | 6/2003 | McDaniel et al. | |
| 6,620,487 B1 | 9/2003 | Tonyan et al. | |
| 6,626,991 B1 | 9/2003 | Drochon et al. | |
| 6,630,417 B2 | 10/2003 | Kawai et al. | |
| 6,644,162 B1 | 11/2003 | Temple et al. | |
| 6,648,961 B2 | 11/2003 | Brothers et al. | |
| 6,656,265 B1 | 12/2003 | Garnier et al. | |
| 6,660,078 B2 | 12/2003 | Brothers et al. | |
| 6,689,286 B2 | 2/2004 | Wilde et al. | |
| 6,811,603 B2 | 11/2004 | Brothers et al. | |
| 6,814,798 B2 | 11/2004 | Vijn et al. | |
| 6,969,422 B2 | 11/2005 | Mazany et al. | |
| 7,112,549 B2 | 9/2006 | Yoshitomi et al. | |
| 7,651,563 B2 | 1/2010 | Datta et al. | |
| 7,666,505 B2 | 2/2010 | Datta et al. | |
| 2001/0043996 A1 | 11/2001 | Yamada et al. | |

| | | | |
|---|---|---|---|
| 2002/0004111 A1 | 1/2002 | Matsubara et al. | |
| 2002/0025436 A1 | 2/2002 | Meyer | |
| 2002/0043996 A1 | 4/2002 | Iwamoto | |
| 2003/0100434 A1 | 5/2003 | Yoshitomi et al. | |
| 2003/0177955 A1 | 9/2003 | Vijn et al. | |
| 2004/0079260 A1 | 4/2004 | Datta et al. | |
| 2004/0080063 A1 | 4/2004 | Datta et al. | |
| 2004/0081827 A1 | 4/2004 | Datta et al. | |
| 2004/0262801 A1 | 12/2004 | Hojaji et al. | |
| 2005/0011412 A1 | 1/2005 | Vijn et al. | |
| 2008/0095692 A1 | 4/2008 | Pham | |
| 2008/0096018 A1 | 4/2008 | Zhang et al. | |
| 2009/0076196 A1 | 3/2009 | Hojaji | |
| 2009/0156385 A1 | 6/2009 | Biscan et al. | |

FOREIGN PATENT DOCUMENTS

| | | | |
|---|---|---|---|
| CN | 101337822 | * | 1/2009 |
| DE | 3213521 A1 | | 6/1983 |
| DE | 3314796 A1 | | 10/1984 |
| DE | 3908172 A1 | | 9/1990 |
| DE | 19962137 A1 | | 6/2001 |
| EP | 0033133 A1 | | 8/1981 |
| EP | 0036275 A1 | | 9/1981 |
| EP | 0102092 | | 3/1984 |
| EP | 0159046 A2 | | 10/1985 |
| EP | 0159173 A2 | | 10/1985 |
| EP | 0242872 A1 | | 10/1987 |
| EP | 0247817 A1 | | 12/1987 |
| EP | 0359362 B1 | | 3/1990 |
| EP | 0430995 B1 | | 6/1991 |
| EP | 0593779 A1 | | 4/1994 |
| EP | 0601594 A1 | | 6/1994 |
| EP | 0717675 | | 6/1996 |
| EP | 0801037 B1 | | 10/1997 |
| EP | 0891954 B1 | | 1/1999 |
| EP | 0931778 B1 | | 7/1999 |
| EP | 0999232 B1 | | 5/2000 |
| EP | 1156021 | | 11/2001 |
| EP | 1160212 A1 | | 12/2001 |
| EP | 1172341 | | 1/2002 |
| EP | 1891984 A1 | | 2/2008 |
| FR | 2671072 | | 7/1992 |
| GB | 413294 | | 7/1934 |
| GB | 682432 | | 11/1952 |
| GB | 0740145 | | 11/1955 |
| GB | 743866 | | 1/1956 |
| GB | 744070 | | 2/1956 |
| GB | 752345 | | 7/1956 |
| GB | 896910 | | 5/1962 |
| GB | 1062410 | | 3/1967 |
| GB | 1066768 | | 4/1967 |
| GB | 1448320 | | 9/1976 |
| GB | 1493202 | | 11/1977 |
| GB | 1493203 | | 11/1977 |
| GB | 1515521 | | 6/1978 |
| GB | 1532922 | | 11/1978 |
| GB | 2019386 | | 10/1979 |
| GB | 2025928 | | 1/1980 |
| GB | 1584175 | | 2/1981 |
| GB | 2248834 | | 4/1992 |
| GB | 2256867 | | 12/1992 |
| GB | 2330138 | | 4/1999 |
| HU | 60701 | * | 10/1992 |
| JP | 2107/1968 | | 8/1968 |
| JP | 192478/1990 | | 7/1990 |
| JP | 4104945 | | 4/1992 |
| JP | 246726/1993 | | 9/1993 |
| JP | 07024299 A | | 1/1995 |
| JP | 07292846 A2 | | 11/1995 |
| JP | 07315869 A | | 12/1995 |
| JP | 08169779 | | 7/1996 |
| JP | 09020526 A | | 1/1997 |
| JP | 09067174 | | 3/1997 |
| JP | 09077543 | | 3/1997 |
| JP | 9124327 | | 5/1997 |
| JP | 09255383 A | | 9/1997 |
| JP | 95648/1998 | | 4/1998 |
| JP | 10095648 | | 4/1998 |
| JP | 10152356 A | | 6/1998 |
| JP | 11116299 A | | 4/1999 |
| JP | 335146/1990 | | 12/1999 |
| JP | 2000119050 | | 4/2000 |
| JP | 2000143307 A | | 5/2000 |
| JP | 2000302498 | | 10/2000 |
| JP | 2001163647 A | | 6/2001 |
| JP | 2001240439 A | | 9/2001 |
| JP | 2002003248 | | 1/2002 |
| JP | 2002037645 | | 2/2002 |
| JP | 2002037680 | | 2/2002 |
| JP | 2002231865 A | | 8/2002 |
| JP | 55064/2003 | | 2/2003 |
| JP | 200373756 A | | 3/2003 |
| RU | 2039019 C1 | | 7/1995 |
| SU | 1650196 A | | 5/1991 |
| SU | 1724613 | | 4/1992 |
| WO | WO-8203386 | | 10/1982 |
| WO | WO-8301947 | | 6/1983 |
| WO | WO-8500361 | | 1/1985 |
| WO | WO-8502394 | | 6/1985 |
| WO | WO-8700827 | | 2/1987 |
| WO | WO-9002102 | | 3/1990 |
| WO | WO-9210440 | | 6/1992 |
| WO | WO-9507177 | | 3/1995 |
| WO | WO-9607538 | | 3/1996 |
| WO | WO-9803284 | | 1/1998 |
| WO | WO-9829353 | | 7/1998 |
| WO | WO-0172863 | | 10/2001 |
| WO | WO-2004018090 A1 | | 3/2004 |
| WO | WO-2004101137 A1 | | 11/2004 |
| WO | WO-2006091929 | | 8/2006 |
| WO | WO-2007067774 | | 6/2007 |

OTHER PUBLICATIONS

Amaral, S.T., Muller, I.L., Passivation of pure iron in alkaline solution containing silicate and sulphate, Corrosion Science, 1999, 747-758, V.41.

Digital Fire Corporation "Do You Need to Know About Eutectics to Make a Good Glaze?" (4 pgs) article located at http://www.digitalfire.ab.ca/cermat/education/119.php?PHPSESSID=1e2d7f3f3a24698394ecaae57ed3b06d5 dated Jul. 14, 2003.

Drogowska, M. et al. Influence of anions on the passivity behavior of copper in alkaline solutions, Surface and Coatings Technology, 1988, 383-400, V.34.

Drozhzhin et al., "Technical Monitoring of Microspheres from Fly Ashes of Electric Power Stations in the Russian Federation" 2005, (8 pgs).

Glass, Corning Glass Works—reprinted version of the Encyclopedia of Chemical Technology (vol. 10) 2nd ed. (pp. 542-543) 1955.

Gubka article "Composition and Morphology of Cenospheres" printed Jul. 11, 2006 located at website: http://www.atom.nw.ru/rie/projects/gubka/properties/cenospheres.shtml (2 pgs).

Hoar, T.P., The Production and breakdown of the passivity of metals, Corrosion Science, 1967, 341-355, V.7.

International Preliminary Report on Patentability and Written Opinion of the International Searching Authority for PCT/US2006/006799, issued Aug. 28, 2007, 11 pp.

Johnson, C.A., et al. Leaching Behaviour and Solubility—Controlling Solid Phases of Heavy Metals in Municipal Solid Waste Incinerator Ash, Waste Management, 1996, 129-134, V. 16(1-3).

Joshi, P.S., et al. Passivation of Carbon Steel Alloy in De-oxygenated Alkaline pH Media, Corrosion Science, 1993, 1367-1379, V. 34(8).

Omurtag, Y. et al. Corrosion Science: Some Investigations on the Corrosion Characteristics of Fe-Si Alloys, 1970, 225-231, V. 10.

Pawlowski et al. "Novel raw material for producing heat insulating materials" Silikattechnik (1982) 33(11), 339-340.

Singh, R., et al. Microporous and Mesoporous Materials: Stabilization of Natural Faujasite Zeolite: Possible Role of Alkaline Earth Metal Ions, 1998, 103-109, V. 21.

Sphere Services Inc. "Cenospheres—Hollow Ceramic Microspheres," article located at http://www.sphereservices.com/ceno.html dated May 15, 2007 (2 pgs).

Stolica, N., Corrosion Science: Pitting Corrosion on Fe-Cr and Fe-Cr-Ni Alloys, 1969, 455-470, V. 9.

Sukhotin, A.M. et al. Corrosion Science: The Passivity of Iron in Acid and Alkaline Solutions, 1965, 393-407, V.5.

Tack, F.M. et al. Environmental Pollution: Metal Solubility as a Function of pH in a Contaminated Dredged Sediment Affected by Oxidation, 1996, 199-208, V.91.

Technology Education—Glass by Encyclopedia Britannica (4 pgs) article located at http://www.geocities.com/tech_ed_2000/industrial/manufacturing/glass/glass.htm dated May 15, 2007.

Tourky, A.R., et al. Corrosion Science: Further Studies on the Effect of C-content on the Corrosion and Passivity of Fe*, 1968, 857-870, V.8.

What Are Cenospheres, article at http://www.microspheres.co.za/contents.htm, printed Jul. 11, 2006 (5 pgs).

Office Action for JP 529583 dated Aug. 18, 2009, with translations, 18 pp.

Litigation documents corresponding to Civil Case Nos. SCVSS115246, 5:04-CV-00674-RT-SGL, 04-C-1621, 05-CV-44, and 04-CV-152 (2004).

Kolay, et al. "Physical, chemical, mineralogical, and thermal properties of cenospheres from an ash lagoon," Cement and Concrete Research 2001, p. 539-542, 31.

Novakovsky, V.M., Thermodynamic and Kinetic Causes of Passivity, Electrochimica Acta, 1965, p. 353-365, V. 10.

Derwent Acc. No. 1992-401310 for HU 60701T published Oct. 28, 1992.

* cited by examiner

MANUFACTURE AND USE OF ENGINEERED CARBIDE AND NITRIDE COMPOSITES

This application is a divisional of U.S. patent application Ser. No. 10/977,344, filed Oct. 29, 2004 now abandoned, the entire contents of which are expressly incorporated herein by reference. U.S. patent application Ser. No. 10/977,344 claims the benefit of U.S. Provisional Patent Application No. 60/515,863, filed Oct. 29, 2003 the entire contents of which are expressly incorporated herein by reference.

BACKGROUND

1. Field of the Invention

The present invention relates generally to carbide and nitride composite materials, the manufacture of such composites, and their use in the glass making process.

2. Description of the Related Art

Any discussion of the prior art throughout the specification should in no way be considered as an admission that such prior art is widely known or forms part of common general knowledge in the field.

Carbides and nitrides are commonly used to form various articles that can withstand high temperature and stress without substantial deterioration. They are particularly suitable for applications in which oxidation at higher temperatures is not desirable, or in which abrasion resistance, thermal and electrical conductivity, dimensional stability, and/or excellent mechanical properties are desired. Typical uses for carbides and nitrides include semiconducting devices, automotive components, grinding and polishing applications, and as refractory in high temperature furnaces. These uses typically require a highly pure form of carbide in order to exhibit the desirable properties that carbides and nitrides are known for. Typical high purity carbide applications require a material that is greater than about 98% pure, while the commercial low grade carbides have purity levels between about 95% and 98%.

Another known use for carbides and nitrides is as blowing agents in foamed glass, ceramic or metal manufacturing processes. When carbide is used as a blowing agent, the carbons combine with oxygen under high temperature conditions to form CO and $CO_2$ gases. The gases in turn are used to expand the softened glass, ceramic precursor or molten metal to form low-density foamed articles having a cellular structure. The same principle applies to the nitrogen in nitrides, which combines with oxygen to form one or more $NO_x$ gases that can be used to expand softened glass, ceramic or metal articles.

Despite the known utility of carbides and nitrides, their widespread use in glass and ceramic manufacturing has been limited to a large extent by their production cost. Even the technical grade products, which are generally less expensive than commercial grade products, are still costly when compared to conventional oxides such as silica and alumina used in the glass and ceramic industries. The high cost is attributable in part to the high cost of manufacturing.

It is also known that many composites containing silicon carbide are formed by dispersing pure silicon carbide particles, whiskers or fibers into a ceramic or glass forming material or metal (or metal alloy) and processing the mixture to form a composite. Homogeneous dispersion of silicon carbide in these composites is often problematic, requiring one or more processing steps to increase dispersion, yet still requires subsequent quality control checks. What is needed is a means of improving the dispersability of silicon carbide in glass, ceramic or metal composites.

From the foregoing, it will be appreciated that producing carbides and nitrides at a low cost and in a state that facilitates dispersability can have significant advantages in the glass, ceramic or metal composite industry where the carbides and nitrides are used extensively to improve the hardness, abrasion resistance, thermal stability or dimensional stability of such composites or where there are used as blowing agents to reduce the density of said composites. There is thus a need for an efficient process that significantly reduces the manufacturing costs of carbides and nitrides and provides them in a form that is amenable to further processing.

SUMMARY

Preferred embodiments provide a method of manufacturing a carbide or nitride composite blowing agent that contains controlled amounts of pre-determined diluents. The preferred embodiments also provide a method of utilizing these blowing agents in a glass or ceramic manufacturing process in a manner such that the diluents do not interfere with the glass or ceramic foaming process. The preferred embodiments also provide a method of formulating precursor materials to manufacture the carbide or nitride composites.

According to one embodiment, a silicon carbide composite comprises silicon carbide and a diluent comprising greater than about 20% by weight of the silicon carbide composite, and wherein the diluent is a functional component of a glass, metal, or ceramic composite. The diluent may be selected from the group consisting of at least one of carbon, silicon, nitrogen, glass forming materials, glass network modifiers, glass network intermediate oxides, ceramic forming materials, metals and metal oxides. In one embodiment, the glass forming materials are silicates, aluminosilicates, borosilicates, borates, and phosphates. According to another embodiment, the glass network modifiers are either alkali earth oxides, alkali oxides or transition metal oxides, or any of a number of other metal oxides. In some embodiments, the ceramic forming materials are either oxides of silicon, aluminum, boron phosphorous, titanium, zirconium, and oxides of alkali or alkaline earth metals or transition metal oxides. The metal is preferably either aluminum, nickel, copper, iron, titanium, magnesium, chromium, zinc, tin, silver, gold, and the platinum family of metals, including combinations or alloys thereof. In some embodiments, the diluent comprises between about 20% and 99 wt. % of the composite.

According to another embodiment of the invention a blowing agent comprises carbide and/or nitride composite containing a diluent, wherein the diluent is a functional component of a glass, ceramic, or metal composite. The diluent may comprise, by weight percent, at least about 5, 10, 20, 40, 50, 80, or more of the blowing agent even up to about 99%. The diluent is preferably silica, carbon, alumina, boron oxide, calcium oxide, magnesium oxide, alkali metal oxides, iron oxide, titanium oxide, zirconium oxide, phosphorous oxide, or combinations thereof. The blowing agent may further comprise a binder, which may be an alkali metal containing binder comprising greater than about 3 wt. % of the blowing agent. According to some embodiments, the binder may be alkali metal silicates, alkali metal borates, alkali metal phosphates, polymer emulsions, polyvinyl alcohol emulsions, cellulose ethers, methylcellulose, or sugar.

Another embodiment of the present invention teaches a method of forming a silicon carbide composite material, wherein the method comprises forming a precursor material comprising at least one silicate material and at least one carbon bearing material; pyrolyzing said precursor to form a carbonaceous mixture; and reacting carbons in said carbonaceous mixture with silicon from said silicate material in the presence of nitrogen or hydrogen, inert gases, or vacuum, to form silicon carbide and a controlled amount of at least one diluent, wherein said diluent makes up at least about 10% by weight of the silicon carbide composite material. The method may further include the step of drying said precursor material prior to pyrolysis. Additionally, forming the precursor material may include the steps of intimately mixing the silica bearing material with the carbon bearing material to form a slurry and drying the slurry and forming particles or aggregates. The particles or aggregates may have a particle size of less than about 1000 microns. Optionally, the pyrolyzing step is performed in a vacuum and may be performed in a non-oxidizing atmosphere. The pyrolyzing temperature may be between about 150 and 600° C., and in some embodiments, the reacting step occurs by heat treatment at a temperature of between about 800 to 1800° C. The heat treatment time can be between about 1 to 500 minutes. Moreover, the heat treatment may be carried out in a single or multiple stages. The carbon bearing material may comprise either carbon black, coke, graphite, pulverized coal, coal powder, ground rubber, a hydrocarbon with straight or branch chain containing up to 1000 carbon atoms, a cyclic or heterocyclic hydrocarbon compound, a carbohydrate including sugar, starch, corn syrup, molasses, fructose, sucrose, natural fibers including cellulose, a resin including phenol resin, furan resin, epoxy or phenoxy resin, oils, greases, glycerin, glycols, paraffin, or mixtures thereof. In some embodiments, the silicate material is a silicon bearing material such as silica fume, silica gel, silicate glass, clay, silicate minerals or rocks, ashes containing silica such as fly ash or rice hull ash, a silane including silane, disilane, chlorosilane, silane tetrachloride, chloroalkylsilane, aminosilane, or mixtures thereof.

According to yet another embodiment, a method of cellulating glass comprises the steps of providing a silicon carbide composite material having silicon carbide, a predetermined diluent, and a binder containing alkali oxide wherein the alkali oxide comprises greater than about 3 wt. % of the silicon carbide composite material; providing a glass forming material; blending the silicon carbide composite material with said glass forming material to form a precursor; heating the precursor to a blowing temperature such that the silicon carbide reacts to give off gas and cellulate the glass; and wherein said predetermined diluent is compatible with the glass forming material. The diluent may be selected such that it is a functional component of the glass matrix. The diluent may comprise at least about 10 wt. % of the silicon carbide composite material, and may be either silica, carbon, alumina, boron oxide, calcium oxide, magnesium oxide, alkali metal oxides, iron oxide, titanium oxide, zirconium oxide, and combinations thereof.

Preferred embodiments of the present invention provide a silicon carbide composite comprising silicon carbide dispersed within a solid diluent. Preferably, the solid diluent is selected to also be a functional component of a glass, metal or ceramic composite such that the diluent will alloy with, dissolve into, react with, sinter with, melt with, or disperse into one or more components of the glass, metal or ceramic composite. Thus, the silicon carbide composite may be incorporated as part of a glass, metal or ceramic composite structure. Alternatively, the silicon carbide composite can be sintered or melted into shaped bodies or articles, or be combined with other materials to form a composite for intermediate use or further processing.

For example, in one embodiment the diluent is a glass-forming material including but not limited to silicates, aluminosilicates, phosphates, or borosilicates material or combinations thereof. In another embodiment the diluent is at least one oxide used in glass manufacturing including but not limited to alumina, borates, zirconia, titania, alkali earth oxides, alkali oxides, transition metal oxides, or other metal oxides. In another embodiment the solid diluent is a ceramic forming material including but not limited to oxides of silicon, aluminum, titanium, zirconium, oxides of alkali or alkaline earth metals, metals, or combinations thereof.

In another embodiment the diluent is a molten metal or metal powder such as aluminum, nickel, copper, iron, titanium, magnesium, chromium, zinc, tin silver, gold, platinum family of metals, or other transition metal, including alloys or combinations thereof. In another embodiment, the diluent is silicon, carbon, germanium or other semiconductor material or combination thereof. Preferably, the diluent comprises no greater than about 99%, of the silicon carbide composite, more preferably no greater than about 80 wt. %, more preferably no greater than about 50 wt. %, more preferably less than 20 wt. %, more preferably between about 1 wt. % and 20 wt. %.

According to yet another embodiment, a precursor material is formed by providing glass forming materials containing at least one carbon source and at least one silica source; heating the glass forming materials to form a quantity of silicon carbide in situ and cooling the glass forming materials thus forming a precursor material having a quantity of silicon carbide therein. In some embodiments, the silicon carbide comprises about 1 wt. % of the precursor material. Optionally a binder material can be added to the glass forming materials which may be an alkali metal containing binder, such as, for example, alkali metal silicates, borates, phosphates, polymer emulsions, polyvinyl alcohol emulsions, cellulose ethers, methylcellulose, and sugar.

BRIEF DESCRIPTION OF THE FIGURES

For more complete understanding of the features and advantages of the inventions described herein, reference is now made to a description of the invention along with accompanying figures, wherein.

DETAILED DESCRIPTION

Embodiments of the present invention stem from the realization that carbides and nitrides are suitable as blowing agents to cellulate glass, ceramic, and metal composites, and more specifically, from the realization that highly pure forms of carbide and nitride are not necessary, especially if the carbides and nitrides are manufactured with desired diluents that are functional components of glass, ceramic, or metal composite products. Thus, preferred embodiments of the present invention disclose the novel concept of manufacturing carbide and nitride composites that contain a controlled amount of at least one diluent material and utilizing the composite carbides or nitrides as blowing agents in glass, ceramic, or metal forming processes.

Moreover, it has been found that carbides and nitrides with predetermined diluents are able to promote dispersion of the carbide and nitride throughout a glass, ceramic, or metal composite.

As used herein, the term "carbide composite" refers to a compound comprising carbide, such as silicon carbide, boron carbide, titanium carbide, tungsten carbide, and analogous oxycarbides and a predetermined amount of a diluent. Likewise, the term "nitride composite" refers to a compound comprising nitride, such as, for example, silicon nitride, boron nitride, aluminum nitride, titanium nitride, tungsten nitride and analogous carbonitrides, in combination with a predetermined amount of a diluent.

The term diluent is a broad term and in one sense refers to a substance that lessens the force, strength, purity, or brilliance of another substance, such as by admixture or dilution. As exemplary embodiments described below, certain diluents are mixed with silicon carbide to form a silicon carbide composite comprising silicon carbide and at least one other material. One such embodiment is silicon carbide containing unreacted carbon and/or silica.

As used herein, the term "functional component" should be construed to mean that one substance is dissolved in, dispersed in, alloys with, reacts with, melts with, sinters with, acts as an inert filler in, or chemically modifies another substance.

The term "cellulate" or "cellulating" refers to introducing one or more gas pockets within a material. Unless otherwise specified herein, cellulate refers to providing one or more cells formed by releasing a gas within a material, such as by blowing, for example.

Preferred embodiments of the present invention disclose the novel concept of manufacturing composites of carbides and nitrides dispersed within the matrix of a preselected diluent. The carbide or nitride composites may be used as blowing agents in glass, ceramic or metal composite manufacturing processes.

The inventors have found that, contrary to conventional wisdom, when the silicon carbides and or nitrides are formed in-situ inside a diluent material that the diluent and carbide/nitride composite is more easily processed and dispersed within other glasses, ceramics or metals. Since the diluent is preselected to have a functional role within the glass, metal or ceramic composite, the diluent can be engineered to not interfere with the function of the carbide or nitride within the composite, or to minimize any deleterious effects the carbide or nitride may have on the composite.

In some embodiments, certain oxides and carbon are advantageously used as a diluent material. For example, silicon carbide having excess unreacted carbon and silica provides an acceptable blowing agent for foamed glass or ceramic because carbon will function as a lower temperature blowing agent and silica is compatible with silica based glass matrices. Other diluents such as silicates, aluminosilicates or borosilicates, or combinations thereof may also be reacted with carbon to form silicon carbide dispersed within a diluent of silicate, aluminosilicate or borosilicate, respectively, any of which may be incorporated into a wide variety of glass or ceramic compositions.

Alternatively, the carbide and/or nitride dispersed in diluent may be directly sintered or melted into shaped bodies or articles. In another embodiment, the carbides or nitrides dispersed in diluent may be added to polymeric materials to form abrasives or to improve the thermal stability or dimensional stability of the polymeric materials.

In addition, preferred embodiments provide a method of manufacturing a carbide or nitride blowing agent in-situ and dispersed within a diluent. The preferred embodiments also provide a method of utilizing these blowing agents to manufacture foamed glass, metal or ceramic composites in a manner such that the diluent becomes a functional part of the glass ceramic or metal composite and does not interfere with the glass or ceramic foaming process. In some embodiments, the diluents may comprise the entirety of the glass or ceramic components. The preferred embodiments also provide a method of formulating precursor materials to manufacture the carbide or nitride within a diluent matrix.

In certain preferred embodiments, the precursor material is formed by mixing at least one silicate material and at least one carbon bearing material. In one embodiment, the silicate material is a silicon bearing material such as silica fume, silica gel, silicate glass, clay, silicate minerals and rocks, ashes containing silica such as fly ash or rice hull ash, ground waste glass, diatomaceous earth, volcanic ash, or a silane including silane, disilane, chlorosilane, silane tetrachloride, chloroalkylsilane, aminosilane and the like, or mixtures thereof.

In one embodiment, the precursor material is formed by mixing a silicate material with a carbon bearing material, with or without a liquid and a binder. When it is desired to form a slurry, water is a preferred liquid. The slurry is either dried, preferably via a spray drying process, or solidified into fine particles or aggregates. The particle size of the dried material is preferably less than about 1 millimeter (mm), and more preferably less than about 500 micrometer ($\mu$m), or less than 250 $\mu$m, more preferably less than about 100 $\mu$m, and in some preferred embodiments, is less than about 50 $\mu$m. The finer particles advantageously heat up to a pyrolysis temperature more quickly, therefore, shorter pyrolysis residence times are required for finer particles as is described in greater detail below.

Alternatively, if the slurry is anhydrous and is in a molten state, such as the mixture of silica fume in molten sugar, the liquid can be drawn or poured into the shape of rods or fibers. The molten mass can optionally be poured between two counter rotating rollers to form solid ribbons or flakes. In another embodiment, the precursor material is formed by grinding together a silicate material and a carbon bearing material, thereby promoting intimate mixing between the materials.

After mixing, the precursor material is subsequently pyrolyzed in which carbon bearing material in the precursor is formed into finely divided carbon particles dispersed substantially uniformly through a pyrolyzed mass, which preferably comprises non-graphitizing carbon with high surface area to unit mass ratio.

Pyrolysis is the thermal decomposition of the carbon bearing material in a vacuum or non-oxidizing atmosphere to form carbon in its elementary form and/or short chain hydrocarbons. The agglomerated particles in the precursor material are preferably pyrolyzed in a suitable reactor either under vacuum and/or non-oxidizing atmosphere induced by purging one or more inert or non-oxidizing gases into the heated reactor. Oxidization is generally undesirable because it causes loss of the formed elementary carbon to carbon monoxide or dioxide gas In one embodiment, the precursor material is dried before the carbon bearing material is pyrolyzed. The carbon bearing material preferably comprises a material selected from the group consisting of a hydrocarbon with straight or branch chain containing up to about 1000 carbon atoms; a cyclic or heterocyclic hydrocarbon compound; a carbohydrate including sugar, starch, corn syrup, fructose, sucrose and the like; natural fibers including cellulosic fibers; cellulose derivatives such as cellulose ethers, methylcellulose, hydroxyethylcellulose and the like; a resin including phenol resin, furan resin, epoxy or phenoxy resin, or the like; oils; greases; glycerin; glycols; paraffin; and mixtures thereof. Advantageously, sugar, corn syrup, or molasses is used in some embodiments because it is a non-toxic and inexpensive carbon source which starts to pyrolyze at relatively low temperatures, such as under about 200° C. Preferably, the carbon bearing material is water soluble, non-toxic, and inexpensive. Certain other hydrocarbons such as polyvinylchloride (PVC), rubber, and petroleum coke can also be used to form graphitizing carbon.

In another preferred embodiment, where the carbon bearing material is in a gas phase, there is no preparation of a precursor material needed. The carbon bearing material is simply present as a part of or whole of the pyrolyzing and reaction atmosphere. Notably, where carbon is added directly, such as in the form of carbon black, coke, pulverized coal, or graphite, the pyrolysis may be omitted from the process.

The pyrolysis temperature depends on the type of carbon bearing material in the precursor. For example, the pyrolysis of sugar starts as low as about 150° C., and is almost complete at about 600° C. Any of a number of reactors for pyrolysis may be used, including, without limitation, a rotating tube calciner, a fluidized bed, an inductive furnace, a plasma furnace, an infra-red furnaces, or a heated chamber such as spray dryer or spray calciner. When a rotating calciner is used, the contact surfaces can either be coated or lined with a non-wetting material such as graphite, carbides, polytetrafluoroethylene and the like to prevent furnace fouling. Preferably, the rotating tube is constructed from graphite and lined from outside with a layer of steel or other appropriate metals. Ground coal or graphite powder may also be added to the feed material as an oxygen scavenger if needed to prevent oxidization. Without wishing to be bound by theory, it is believed that during pyrolysis sugar is converted to ultra fine reactive carbon particles forming a uniform carbon coating around each individual siliceous grain. Pyrolysis can be carried out in a single step, or may be performed during multiple steps. When the carbon bearing material is carbon itself, for example in the form of carbon black or graphite, the pyrolysis step is not required.

The carbide forming furnace may be a rotary tube calciner, a spray heated reactor, a dense phase fluidized bed, or any of a number of suitable furnaces. The heated feed materials are maintained at the desired temperature for a predetermined amount of time based upon the initial material composition, any economic driving considerations, and the desired material composition after processing. For example, the heat treatment temperatures and duration are controlled in order to produce carbide with predetermined diluents.

Subsequently, the carbonaceous mixture is preferably heated in a furnace to react the carbons with silicon present in the silicon bearing material to form carbides dispersed within a diluent matrix. In the presence of nitrogen, either in the precursor material or the atmosphere, silicon nitride also forms as a part of the reaction. In one preferred embodiment, some diluent components, such as alkali metal silicates or borates, may act as a flux or binder during heat treatment that forms a glassy layer enveloping the precursor particles or particle aggregates. The glassy envelope creates sealed non-oxidizing micro reaction zones, where the precursor material within can react independent of the surrounding environment.

The pyrolyzed feed materials are preferably heated at a rate within the range of from about 1° C. to about 1000° C. per minute, and more preferably within the range of from about 10° C. to about 100° C. per minute, and in one preferred embodiment, the pyrolyzed feed materials are heated at a rate of 30° C. per minute.

In embodiments in which the economy is a major driver, the heat treatment time and temperature versus product quality are optimized for minimum energy usage. In other embodiments, the acceptable maximum diluent level is set by the minimum required blowing quality of carbide when used as a blowing agent to produce expanded glass and ceramic articles, and can be as high as 80% or greater.

The preferred heat treatment temperature range is from about 1000° C. to about 1700° C., more preferably from about 1050° C. to about 1500° C. The heat treatment time is preferably from about 1 to 500 minutes, more preferably from about 10 to 100 minutes, more preferably from about 15 to 60 minutes. Preferably, the heat treatment is done in a non-oxidizing atmosphere that does not contain any additional oxygen containing gas or additional carbon monoxide other than that may have been naturally formed during the heat treatment due to the reactions. Such atmospheres include nitrogen, hydrogen, inert gasses, and vacuum.

In another embodiment, the non-oxidizing atmosphere contains nitrogen gas and gases formed during heat treatment. In another embodiment, the heat treatment can be carried out in a single stage or multiple stages. It should be noted that the presence of an active reducing agent, such as hydrogen or methane, can promote the reaction rate and increase the final carbide yield in the product.

In one preferred embodiment, the silicon bearing material contains other oxides such as alumina, boron oxide, and metal oxides. During processing, these materials convert partially to silicon carbide and the remaining oxides which do not convert to carbides form a diluent that may be incorporated into glasses, ceramics, or metal composites. When the resulting carbides are used as blowing agents, the diluents will become a part of the expanded glass, ceramic, or metal articles.

The use of carbides and nitrides as blowing agents is discussed in greater detail in the inventors' own copending U.S. patent application having Ser. No. 10/787,894, filed on Feb. 25, 2004, the entirety of which is expressly incorporated herein by reference.

In another embodiment, diluents consist of at least one of carbon; minerals such as silica or alumina; metals such as silicon, iron, nickel, copper or aluminum; metal oxides including alkaline metal oxides such as sodium oxide or potassium oxide; alkaline earth metal oxides such as calcium oxide or magnesium oxide; transition metal oxides such as copper oxide, iron oxide, or nickel oxide and other metal oxides such as aluminum oxide or lead oxide; alkaline inorganic compounds such as sodium silicate, alkali phosphates, borax, and combinations thereof.

In another embodiment, the diluent is a glass-forming material including but not limited to silicates, aluminosilicates or borosilicates or combinations thereof. In another embodiment the solid diluent is a ceramic forming material including but not limited to oxides of silicon, aluminum, phosphorous, titanium, zirconium, oxides of alkali or alkaline earth metals, metal oxides, or combinations thereof.

In another embodiment the diluent is a molten metal or metal powder such as aluminum, nickel, copper, iron, titanium, tin, silver, gold, one of the platinum family of metals, magnesium, chromium, zinc, or other transition metal, including alloys or combinations thereof. In another embodiment, the diluent is silicon, carbon, germanium or other semiconductor material or combinations thereof.

Preferably, the overall percentage of the diluent within the carbide or nitride is less than about 80 wt. %, more preferably less than about 50 wt. %, and more preferably less than about 20 wt. %. However, the diluent percentage within the carbide or nitride can be greater than 80% with acceptable results depending on the application for which the carbide or nitride is designed.

As another approach to forming foamed materials by utilizing carbides and nitrides as cellulating agents is to provide the glass or ceramic forming materials and to form the carbide or nitride in situ, thereby creating a precursor material having a blowing agent in a single step. As an example of single-step precursor formation, silica fume, graphite, and sodium silicate are mixed together. The mixture is then heat treated for a predetermined amount of time at a desired temperature to form a quantity of silicon carbide, such as about 1, 2, 5, or 10 wt. % of the total weight of the precursor. The silicon carbide is thus formed in situ and can be used as a blowing agent in the precursor material in a subsequent glass foaming process. In many embodiments, as little as 1 wt. % or less of the precursor material is silicon carbide. According to this approach, a silicon carbide composite is produced having silicon carbide and diluents wherein the silicon carbide comprises about 1 wt. % of the composite.

The following specific examples should not be construed as limiting the scope of the invention, but are used to illustrate certain embodiments within the present scope.

EXAMPLE 1

Example 1 illustrates a method of manufacturing a mostly amorphous silicon carbide product by using a pyrolyzed carbonaceous source and a siliceous source.

A mixture was made from 1 part by weight of silica fume, three parts of sugar, and sufficient water to form a slurry with a syrupy consistency. The slurry was dried at 105° C. to form a brittle solid cake. The solid cake was then coarsely ground into a precursor powder having a nominal size of 500 μm.

An enclosed graphite crucible was filled with the precursor powder and heated at 200° C. for 1 hour, and then at 400° C. for 3 hours to melt and pyrolyze the sugar. The crucible was then heated at 1500° C. for 5 hours to allow graphite formation, and then cooled to room temperature. The graphite wall of the crucible acted as an oxygen scavenger and ensured a non-oxidizing atmosphere within the crucible for sugar pyrolysis and carbide formation.

Figure 1:
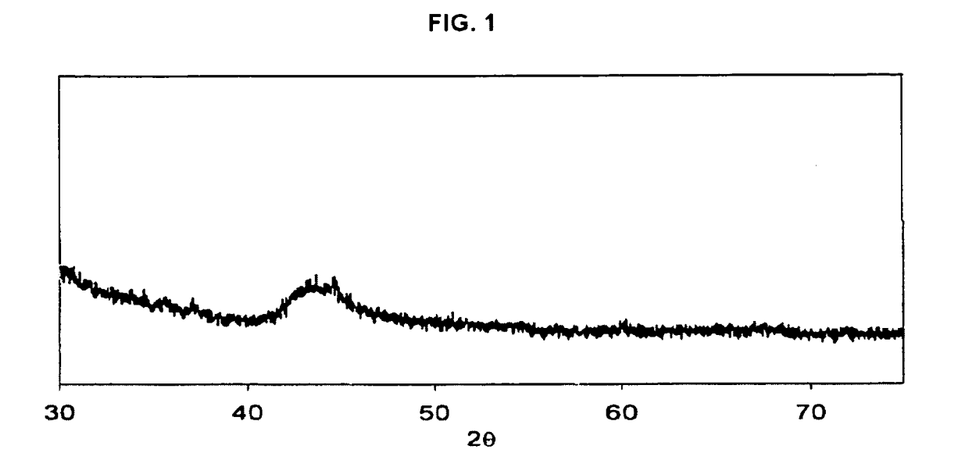
FIG. 1 shows the XRD pattern of a sample as described herein.

A sample of the powder formed in the crucible was then subjected to X-ray Diffraction analysis (XRD). FIG. 1 shows the XRD pattern of the sample. As can be seen from FIG. 1, the powder is mostly amorphous due to the lack of a level baseline and clearly defined peaks, which would indicate a crystalline structure.

Figure 2:
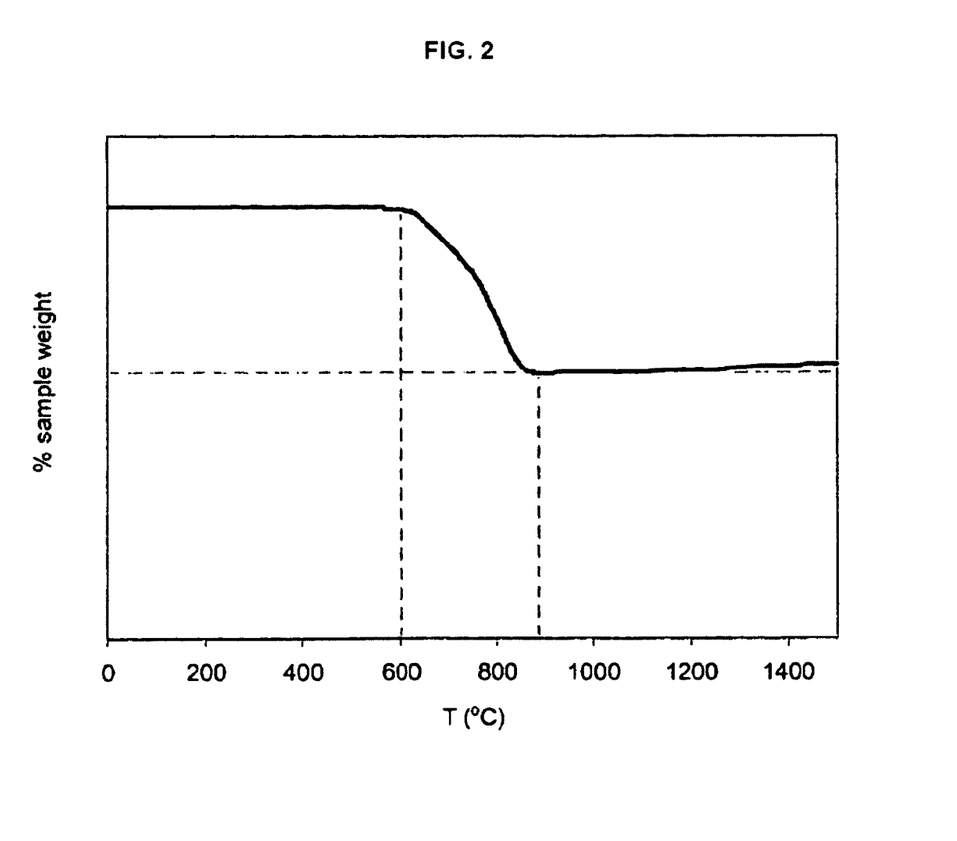
FIG. 2 shows the weight change of another sample described herein as a function of temperature.

Another sample of the powder of Example 1 was subjected to a constant heating rate Thermogravimetric Analysis (TGA) in air. The TGA utilized a heating rate of 6° C. per min, from room temperature to 1500° C. FIG. 2 shows the weight loss or gain of the sample as a function of temperature. As can be seen from FIG. 2, some weight loss was detected from 600° C. to about 890° C., followed by weight gain from 890° C.

Figure 3:
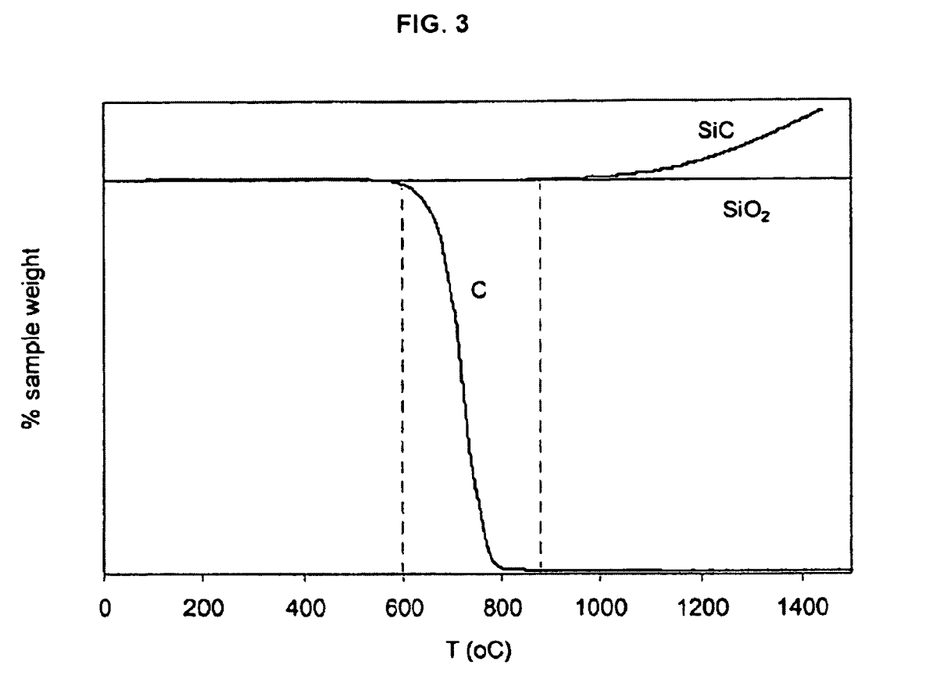
FIG. 3 shows Thermogravimetric Analysis (TGA) on carbon (graphite), silicon oxide and silicon carbide in air.

FIG. 2 is further understood by reference to FIG. 3 which shows separate results of the same TGA heating treatments for carbon (graphite), silicon oxide and silicon carbide in air. It can be seen that silicon oxide weight remains relatively constant throughout the heating period. Graphite, on the other hand, is burned off in the air from 600° C., showing a weight loss. Silicon carbide when heated in the air is oxidized from 880° C., to form silicon oxide, accounting for the weight gain.

The plot in FIG. 3 indicates that the weight loss observed in FIG. 2 for the sample corresponds to carbon and short-chain hydrocarbons burned off in the presence of air. The weight gain from about 890° C. indicates that silicon carbide was present in the sample, and was oxidized to form silicon oxide. Therefore, the XRD and TGA results show that amorphous silicon carbide was formed in Example 1.

With each unit of weight of silicon carbide oxidized to form silicon oxide, there is a weight gain of half a unit. The weight gain from 890° C. to 1500° C. for the sample was approximately 2% of the original sample weight. At T=1500° C. when this experiment was stopped, the data shows that there was at least 4% by weight of amorphous silicon carbide present in the sample. From the inclining tendency of FIG. 2 with increased temperature, it is clear that that further weight gain will continue if the sample is subjected to additional heating.

EXAMPLE 2

Example 2 illustrates the use of a binder with siliceous and carbonaceous starting materials used to produce silicon carbide in a crystallite form.

A mixture was prepared from 3 parts by weight of a silica fume, 6 parts of graphite powder, and 1 part of sodium silicate. The mixture was then placed into an alumina crucible. An extra 3 parts of graphite powder was then placed on top of the mixture to completely fill the crucible. A lid was placed on top to enclose the crucible. The crucible was then heated at 1500° C. for 4 hours, and then allowed to cool to room temperature.

The extra graphite acted as an oxygen scavenger to ensure a non-oxidizing environment in the crucible during the carbide formation. The sodium silicate is used as a fluxing and binding agent to bind the silicon carbide and unreacted carbon and silica in a uniform mass.

Figure 4:
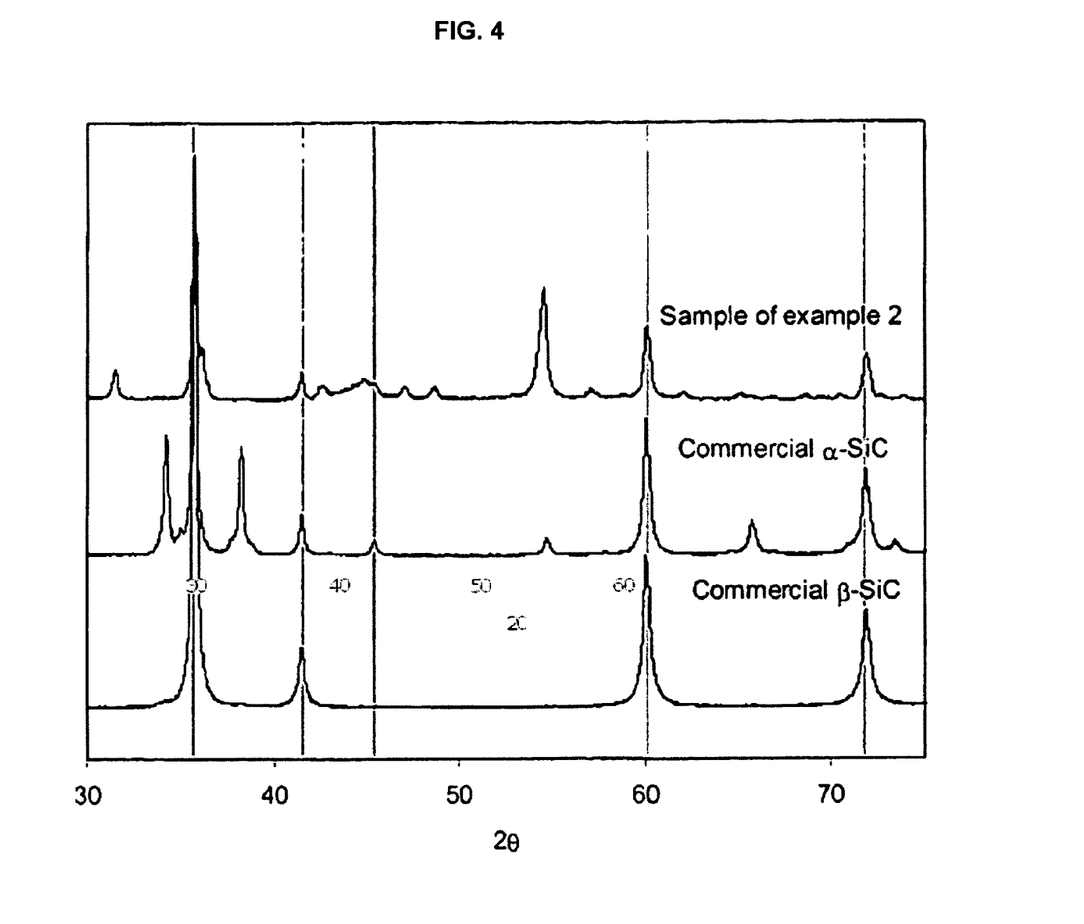
FIG. 4 shows X-Ray Diffraction analysis (XRD) pattern for a sample as described herein, together with patterns for α-SiC, and β-SiC.

The powder formed in the crucible was then subjected to XRD analysis. FIG. 4 shows the XRD pattern for the sample, together with the patterns for α-SiC, and β-SiC available commercially. Distinct peaks of SiC at 35.7°, 41.58°, 45.3° and 72° can be seen in the XRD pattern of the sample. The XRD pattern also indicates the presence of diluents, including silicon oxide in cristobalite form, and carbon in graphite form, as indicated by the peaks at 31.36 and 54.582, respectively.

EXAMPLE 3

Example 3 was prepared my mixing 7.5 parts by weight of a powdered commercial montmorillonite clay containing 60% by weight silica with an average particle size of 5 microns with 1 part sugar in water to form pumpable slurry. The slurry was simultaneously spray dried and pyrolyzed in air using a conventional spray drier to form round pellets with an average diameter of 50 microns. The spray drier outlet temperature was maintained at 275° C. The pellets were subsequently heated at 1200° C. in nitrogen to form a powdered material containing silicon carbide dispersed in a diluent of alumina and calcined montmorillonite clay. This SiC rich material is suitable for addition to ceramics or glasses using montmorillonite clays as a raw material.

EXAMPLE 4

Example 4 was prepared by mixing 16 parts of sodium silicate (dry basis) with 1 part sugar in water to form a thick, pumpable solution. The solution was simultaneously spray dried and pyrolyzed in air using a conventional spray drier to form round beads with an average diameter of 10 microns. The spray drier outlet temperature was maintained at 275° C. The pellets were subsequently heated at 950° C. in nitrogen to form beads of sodium silicate having a substantial amount of silicon carbide dispersed therein. This SiC rich material is suitable for addition to ceramics or glasses using sodium silicate as a raw material, such as, for example, to make foamed glasses.

Silicon carbide produced by the disclosed processes and having the described diluents may be added to metals as a reinforcing agent to form a metal matrix composite, or optionally together with other powders that can release oxygen. In the oxygen releasing applications, the released oxygen can react with the carbide to form gas bubbles within the metal matrix. The foaming temperature is preferably selected at or above the oxidation temperature of carbide, e.g. above 800° C. For example, ferric oxide, manganese dioxide, and the like can be mixed with carbide and added to an appropriate metal matrix compound and heated to a temperature that is above the oxidation temperature of carbide. The oxide will release oxygen that is used to form CO or $CO_2$ gases which in turn will cellulate the matrix. Cooling of the matrix resulted in a multicellular foamed metal composite.

The advantageous results achieved by the presently disclosed materials and methods are that carbides and nitrides can be formed without the requirement of high purity, as is typically required in the carbide and nitride forming arts. Even more advantageous is an effective use for carbide and nitride composites as blowing agents in glass and ceramic forming processes. Finally, by selecting appropriate raw materials, the diluents can be incorporated into the glass, ceramic, or metal matrix, and may even be materials commonly found in glass, ceramics, and metals composites thus avoiding any detrimental effects to the formed products.

Although the foregoing description of preferred embodiments of the present invention have shown, described and pointed out the fundamental novel features of the invention, it will be understood that various omissions, substitutions, and changes in the form of the detail of the preferred embodiments of the invention may be made by those skilled in the art, without departing from the spirit and scope of the invention. Consequently, the scope of the invention should not be limited to the foregoing discussion, but should be defined by a fair reading of the following claims.

What is claimed is:

1. A method of forming a precursor material, comprising:
providing glass forming materials containing at least one carbon source and at least one silica source and including a binder material, wherein the binder material is an alkali metal containing binder;
heating said glass forming materials to form a quantity of silicon carbide in situ;
cooling the glass forming materials thus providing the precursor material with a quantity of silicon carbide therein.

2. The method of claim 1, wherein the silicon carbide is a blowing agent.

3. The method of claim 1, wherein the alkali metal containing binder is selected from the group consisting of alkali metal silicates, alkali metal borates and alkali metal phosphates.

4. The method of claim 1, wherein the silicon carbide makes up about 1 wt. % of the precursor material.

5. The method of claim 1, wherein the glass forming materials and binder form a slurry.

6. The method of claim 5, wherein the slurry is dried.

7. The method of claim 5, wherein the glass forming material is drawn or further shaped.

8. The method of claim 1 further comprising grinding together the at least one carbon source and at least one silica source.

9. The method of claim 1, wherein the heating includes pyrolyzing.

10. The method of claim 1, wherein the at least one carbon source is one or more of a straight chain hydrocarbon, branch chain hydrocarbon or cyclic hydrocarbon.

11. The method of claim 1, wherein the heating is carried out during one or more steps.

12. A method of forming a precursor material, comprising:
providing glass forming materials containing at least one carbon source and at least one silica source;
heating said glass forming materials to form a quantity of silicon carbide in situ;
cooling the glass forming materials thus providing a precursor material with a quantity of silicon carbide therein, wherein the silicon carbide makes up to about 1 wt. % of the precursor material.

13. The method of claim 12, further comprising the step of adding a binder material to the glass forming materials before heating.

14. The method of claim 13, wherein the binder material is an alkali metal containing binder.

15. The method of claim 13, wherein the binder material is selected from the group consisting of alkali metal silicate, borate, phosphate, polymer emulsion, polyvinyl alcohol emulsion, cellulose ether, methylcellulose, and sugar.

16. A method of forming a precursor material, comprising:
providing glass forming materials and a binder, wherein the glass forming materials contain at least one carbon source and at least one silica source, and wherein the binder contains an alkali metal;
heating said materials to form a quantity of silicon carbide in situ;
cooling the materials thus providing the precursor material with a quantity of silicon carbide therein.

17. The method of claim 16, wherein the silicon carbide is a blowing agent.

18. The method of claim 16, wherein the glass forming materials and binder are formed into a slurry.

19. The method of claim 18, wherein the slurry is dried.

20. The method of claim 16 further comprising grinding together the glass forming materials.

21. The method of claim 16, wherein the heating includes pyrolyzing.

22. The method of claim 16, wherein the heating is carried out during one or more steps.

* * * * *